April 9, 1929.　　　J. R. GAMMETER　　　1,708,088

SHOE HEEL AND METHOD OF MAKING THE SAME

Filed April 26, 1927

Inventor
John R. Gammeter
By Willard D. Eakin
Atty.

Patented Apr. 9, 1929.

1,708,088

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

SHOE HEEL AND METHOD OF MAKING THE SAME.

Application filed April 26, 1927. Serial No. 186,692.

This invention relates to shoe heels and methods of making the same and its chief objects are to provide an improved heel and to provide a highly serviceable heel at small cost. More specific objects are to provide a cored-type heel in which the core will be inexpensive and durable and in which the cushion portion of the heel will be securely united with the core. A further object is to provide a sufficiently stiff and strong core member, adapted to be nailed through without preparatory perforation and to serve as a suitable anchoring member for the heads of the nails, without expensive fabrication of the core member. Another object is to provide a heel of light weight.

Figure 1:
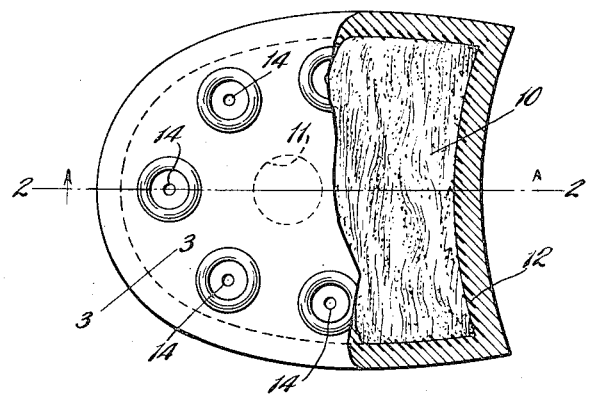
Fig. 1 is a reverse plan view, with a part sectioned and broken away, of a heel embodying and made in accordance with my invention in its preferred form.
Figure 2:
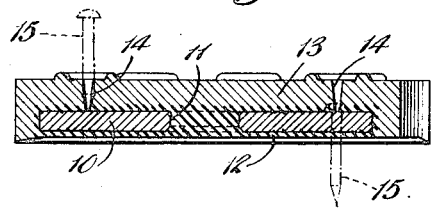
Fig. 2 is a section on line 2—2 of Fig. 1.
Figure 3:
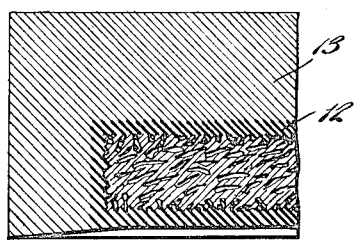
Fig. 3 is a vertical section of a portion of the heel on a larger scale.

Referring to the drawings, the heel comprises a core 10 of a stiff, strong material adapted to be nailed through and to afford a strong anchorage for the heads of the nails and having a surface of a highly porous character such as to afford a strong anchorage of rubber applied thereto and interlocked with the walls of its surface pores only. The best material that I thus far have found for answering these requirements is the wood of the yucca plant, which in its natural state possesses the qualities of lightness, toughness and porosity, and consequently, after proper drying, requires only to be cut to proper shape to provide a shoe-heel core answering all of the above-stated requirements, and which is easily cut to shape. Such a core is well adapted to provide a strong anchorage of the rubber without penetration of the rubber beyond its surface pores, as distinguished from completely impregnating a fibrous core or molding a heel upon a perforated metal plate.

The core 10 may be formed with one or more through-apertures, such as the aperture 11, for riveting of the rubber of the heel-cushion therethrough, but I do not limit my invention to a through-apertured core, since the porosity of the surface may be relied upon alone for adhesion of the rubber cushion to the core.

In making the heel I preferably apply first to the lower face or tread side of the porous core a layer 12 of high grade and elastic rubber with a comparatively small amount of filler or no filler therein, in order that the rubber may permeate deeply into the surface pores of the core and in order that the said layer may yield locally and thus avoid local separation of the layer from the core, the local yielding of the rubber permitting the separating force to be sustained over a comparatively large surface of the core. The layer 12 may be extended over all faces of the core but I find that it may be omitted from all but the lower face or the lower face and the side faces without much detriment, as it is upon the lower face that adhesion is most important.

The high-grade rubber layer 12 may be applied to the core in the form of a rubber cement and the solvent evaporated, but it is preferably applied simply by placing a thin layer of the compound upon the core in filling the heel mold. A thin sheet of rubber, which may be of ordinary heel stock preferably is applied to the attachment face of the core, and I find that good results may be obtained by simply placing a suitable sheet of such stock in the mold, and then stacking upon it the core, the layer of high grade compound, and a heel blank of ordinary heel stock, to form a cushion member 13, and then applying the mold cover and vulcanizing the heel under pressure in the usual manner.

The core is preferably made of such size and so placed in the mold that the rubber of the heel will extend over the entire surfaces of the core, to keep moisture out of the porous core and to provide a sightly appearance.

The cushion member may be molded with spaced recesses 14, 14 to receive nails such as the nails 15, 15 for attaching the heel to the shoe.

In molding the heel under heavy pressure the fibers of the inner regions of the core may be so compacted and condensed as to reduce the porosity of the wood in that region and thereby provide a more firm anchorage for the nail heads.

In the manner described I obtain the advantages in procedure and in the product which are set out in the above statement of objects. Economy of manufacture is provided, especially when a core of yucca wood is employed, as it is inexpensive as compared with the rubber which it displaces and it may be readily cut to shape.

My invention is susceptible of modification within the scope of the appended claims.

I claim:

1. The method of making a shoe heel which comprises superposing in succession upon a core having surface pores, a layer of high grade rubber and a layer of low grade rubber and uniting the elements solely by heat and pressure.

2. A shoe heel comprising a core having coarse surface pores, a layer of high grade rubber directly interlocked with the walls of the pores and a layer of lower grade rubber vulcanized to the layer of high grade rubber.

3. A shoe heel comprising a nail-receiving insert of yucca wood, a layer of high grade rubber directly interlocked with the walls of the surface pores of the insert and a cushion of lower grade rubber vulcanized to the high grade rubber.

In witness whereof I have hereunto set my hand this 22nd day of April, 1927.

JOHN R. GAMMETER.